March 6, 1928.                    1,661,854
F. C. RIDGELY
STORAGE BATTERY DEVICE
Filed Feb. 20, 1925

Inventor
FLORENCE. C. RIDGELY.
By
Attorney

Patented Mar. 6, 1928.

1,661,854

UNITED STATES PATENT OFFICE.

FLORENCE C. RIDGELY, OF DETROIT, MICHIGAN.

STORAGE-BATTERY DEVICE.

Application filed February 20, 1925. Serial No. 10,483.

The primary object of my invention is to provide a device for holding oil, grease, paraffine, or any other oily substance on, over, under or around a battery post that can be used in connection with a storage battery for the purpose of eliminating or stopping corrosion.

It is a further object of my invention to provide a device that is of simple and economical construction and one that can be easily attached to or taken off a battery post.

With the above and other objects in view, my invention consists in the arrangement, combination and construction of the various parts of my improved device as described in the specification, claimed in my claims and shown in the accompanying drawings, in which:

Figure 1:
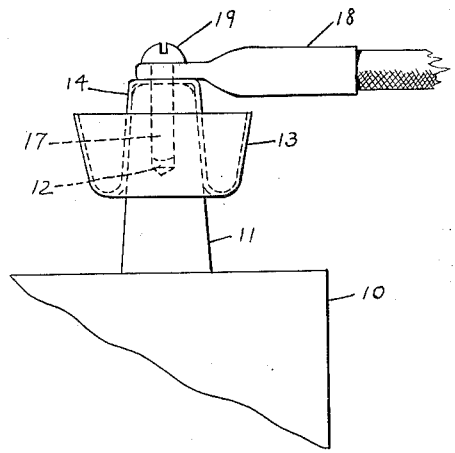
Fig. 1 is a front elevation of my improved device attached to a storage battery post.
Figure 2:
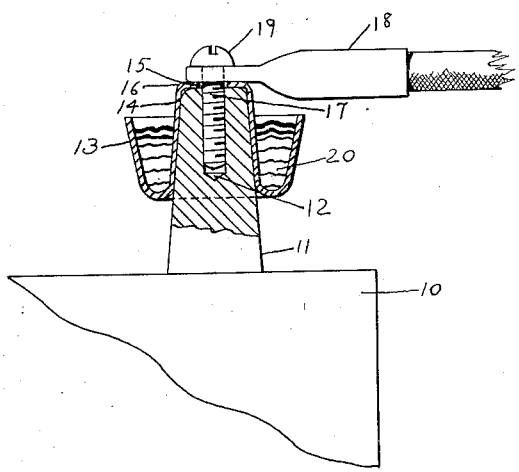
Fig. 2 is a central sectional view of my improved device as attached to the storage battery post.
Figure 3:
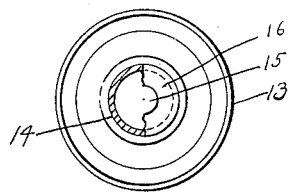
Fig. 3 is a plan view of my improved device shown partly in section.

I have shown a section of a battery 10 having the battery post 11 with the aperture 12 therein.

My improved device consists in an antimonial lead, or other suitable cup 13, which has the centrally protruding cap 14 with the aperture 15 in the top 16 thereof. The cup 13 is fitted over the post 11 and is made secure by the screw 17 passing through the aperture 15 into the aperture 12 of the battery post 11.

A copper cable terminal 18 is placed on the bolt 17 between the head 19 thereof and the top 16 of the cap 14. An oily substance 20 is placed into the cup 13 to aid in preventing corrosion around the post.

I desire it to be understood that my antimonial lead cup filled with an oily substance may be secured through slight changes in construction to a battery post in a number of different ways and further that the cable terminal leading from the post may be secured thereto so as not to interfere with the benefits derived from my improved device.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a storage battery conducting post, a cup-like member having a central hollow protrusion therein adapted to fit over said post, a recess in said post and an aligned opening in said protrusion, a screw extended into said opening and adapted to secure said cup-like member to said post and a terminal member secured to said screw above said cup-like member.

2. A hat shaped member having its crown adapted to fit over the end of a storage battery terminal, and its brim forming a receptacle for holding a non-corrosive element.

3. In combination, an electric storage battery having a terminal post thereon, a hat shaped member having its crown adapted to fit over said terminal post, and its brim forming a receptacle for holding a non-corrosive element around said terminal post.

4. In combination, an electric storage battery having a terminal post thereon, a hat shaped member having its crown adapted to fit over said terminal post, and its brim forming a receptacle for holding a non-corrosive element around said terminal post, and a non-corrosive element in said receptacle formed by the brim of said hat shaped member.

FLORENCE C. RIDGELY.